United States Patent
Rendahl et al.

(10) Patent No.: US 11,151,119 B2
(45) Date of Patent: Oct. 19, 2021

(54) TEXTUAL OVERLAY FOR INDICATING CONTENT VERACITY

(71) Applicant: INTERNATIONAL BUSINESS MACHINES CORPORATION, Armonk, NY (US)

(72) Inventors: Randy A. Rendahl, Raleigh, NC (US); Glenn Fuller, Research Triangle Park, NC (US); Colleen Lhota, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 294 days.

(21) Appl. No.: 16/205,317

(22) Filed: Nov. 30, 2018

(65) Prior Publication Data

US 2020/0174991 A1 Jun. 4, 2020

(51) Int. Cl.
| | |
|---|---|
| *G06F 16/20* | (2019.01) |
| *G06F 16/23* | (2019.01) |
| *G06F 16/93* | (2019.01) |
| *G06Q 30/02* | (2012.01) |
| *G06F 16/245* | (2019.01) |
| *G06F 16/22* | (2019.01) |

(52) U.S. Cl.
CPC ...... *G06F 16/2365* (2019.01); *G06F 16/2228* (2019.01); *G06F 16/245* (2019.01); *G06F 16/93* (2019.01); *G06Q 30/0245* (2013.01)

(58) Field of Classification Search
CPC .... G06F 16/2365; G06F 16/245; G06F 16/93; G06F 16/2228; G06F 16/0245
See application file for complete search history.

(56) References Cited

U.S. PATENT DOCUMENTS

| | | | |
|---|---|---|---|
| 9,189,514 B1* | 11/2015 | Myslinski | G06F 40/226 |
| 9,563,608 B1* | 2/2017 | Ashtiani | G06F 40/258 |
| 2009/0157490 A1* | 6/2009 | Lawyer | G06F 16/23 |
| | | | 705/59 |
| 2010/0268776 A1 | 10/2010 | Gerke | |
| 2012/0310937 A1* | 12/2012 | Stibel | G06F 16/951 |
| | | | 707/737 |
| 2013/0159127 A1* | 6/2013 | Myslinski | G06Q 30/02 |
| | | | 705/26.1 |

(Continued)

OTHER PUBLICATIONS

James Fairbanks, et al., "Credibility Assessment in the News: Do We Need to Read?", MIS2, 2018, Mariana del Rey, CA USA, (8 pages) [online at the Internet: https://snap.stanford.edu/mis2/files/MIS2_paper_17.pdf].

*Primary Examiner* — Tarek Chbouki
(74) *Attorney, Agent, or Firm* — F. Chau & Associates, LLC

(57) ABSTRACT

Systems and methods for assessing the veracity of content are described. The method may include determining a truth rating for each of a plurality of factual claims in a document, generating a veracity score for the document based on the truth rating for each of the identified plurality of factual claims, generating a meta-data score for the document based on metadata of the document, and generating a content structure score for the document. The method may then include generating a reliability index for the document based on the veracity score and the meta-data score and presenting the scores and the overall reliability index to a user via a user application.

20 Claims, 10 Drawing Sheets

(56) References Cited

U.S. PATENT DOCUMENTS

| | | |
|---|---|---|
| 2014/0316911 A1 | 10/2014 | Gross |
| 2015/0127325 A1* | 5/2015 | Birnbaum ............. G06F 40/253 704/9 |
| 2015/0193436 A1* | 7/2015 | Slaney .................. G06F 16/334 707/728 |
| 2016/0070743 A1 | 3/2016 | Myslinski |
| 2016/0239496 A1* | 8/2016 | Motte ................... G06F 40/253 |
| 2020/0202073 A1* | 6/2020 | Ghulati .................. G06F 40/30 |

* cited by examiner

TEXTUAL OVERLAY FOR INDICATING CONTENT VERACITY

TECHNICAL FIELD

The following relates generally to an overlay for displaying text on a graphical interface, and more specifically to generating a textual overlay by assessing the veracity of the textual content.

BACKGROUND

In the current state of the internet, information is derived from a multitude of sources. Individuals and organizations have the ability to contribute information to the internet through websites, news platforms, blogs, social media platforms, apps, and other applications. In certain cases, this information may be erroneous, either inadvertently or purposefully, depending upon the motivation of the contributor.

Due to the large amount of information available to the user of the internet, there is a challenge with knowing and gauging the accuracy, reliability, and fidelity of the information. It can be challenging to distinguish factual information from fictional information, and to truly trust the content. Furthermore, content-providers currently do not have a way to certify the reliability of the information. Thus, users consuming textual information using a graphical interface may not be provided sufficient information while reading the text to determine the reliability of the displayed information.

SUMMARY

A method for assessing the veracity of content is described. The method may include determining a truth rating for each of a plurality of factual claims in a document, generating a veracity score for the document based on the truth rating for each of the identified plurality of factual claims, generating a meta-data score for the document based on metadata of the document, generating a reliability index for the document based on the veracity score and the meta-data score, and presenting the veracity score, the meta-data score, or the reliability index to a user via a user application.

An apparatus for assessing the veracity of content is described. The apparatus may include a processor, memory in electronic communication with the processor, and instructions stored in the memory. The instructions may be operable to cause the processor to determine a truth rating for each of a plurality of factual claims in a document, generate a veracity score for the document based on the truth rating for each of the identified plurality of factual claims, generate a meta-data score for the document based on metadata of the document, generate a reliability index for the document based on the veracity score and the meta-data score, and present the veracity score, the meta-data score, or the reliability index to a user via a user application.

A non-transitory computer readable medium storing code for assessing the veracity of content is described. In some examples, the code comprises instructions executable by a processor to: determine a truth rating for each of a plurality of factual claims in a document, generate a veracity score for the document based on the truth rating for each of the identified plurality of factual claims, generate a meta-data score for the document based on metadata of the document, generate a reliability index for the document based on the veracity score and the meta-data score, and present the veracity score, the meta-data score, or the reliability index to a user via a user application.

Some examples of the method, apparatus, and non-transitory computer-readable medium described above may further include querying one or more trusted data repositories for each factual claim of the plurality of factual claims. Some examples of the method, apparatus, and non-transitory computer-readable medium described above may further include assigning a positive rating to the factual claim if the query indicates the query indicates the factual claim is true. Some examples of the method, apparatus, and non-transitory computer-readable medium described above may further include assigning a neutral rating to the factual claim if the query indicates the query indicates that the factual claim cannot be verified. Some examples of the method, apparatus, and non-transitory computer-readable medium described above may further include assigning a negative rating to the factual claim if the query indicates the query indicates the factual claim is false.

Some examples of the method, apparatus, and non-transitory computer-readable medium described above may further include determining a ratio of true factual claims for the document based at least in part on the positive rating, the neutral rating, or the negative rating, wherein the veracity score is based on the ratio of true factual claims.

Some examples of the method, apparatus, and non-transitory computer-readable medium described above may further include identifying one or more citations from supporting the plurality of factual claims. Some examples of the method, apparatus, and non-transitory computer-readable medium described above may further include determining whether the one or more citations are verifiable. Some examples of the method, apparatus, and non-transitory computer-readable medium described above may further include generating a citation index based on the determination of whether the one or more citations are verifiable, wherein the veracity score is based at least in part on the citation index.

Some examples of the method, apparatus, and non-transitory computer-readable medium described above may further include generating an author rating based on an author of the document, wherein the meta-data score is based at least in part on the author rating. Some examples of the method, apparatus, and non-transitory computer-readable medium described above may further include generating a source rating based on a source of the document, wherein the meta-data score is based at least in part on the source rating. Some examples of the method, apparatus, and non-transitory computer-readable medium described above may further include generating an advertising rating based on one or more advertisements presented together with the document at a document source, wherein the meta-data score is based at least in part on the advertising rating.

Some examples of the method, apparatus, and non-transitory computer-readable medium described above may further include generating a content structure score based at least in part on an authorship rating, a document references rating, a spelling rating, a grammar rating, or any combination thereof, wherein the reliability index is based at least in part on the content structure score.

Some examples of the method, apparatus, and non-transitory computer-readable medium described above may further include assigning a category weight to the veracity score, the meta-data score, a content structure score, or any combination thereof, wherein the reliability index is based at least in part on the category weights.

In some examples of the method, apparatus, and non-transitory computer-readable medium described above, the presenting the veracity score, the meta-data score, or the reliability index comprises modifying a visual representation of the document. In some examples of the method, apparatus, and non-transitory computer-readable medium described above, the visual representation comprises a header area including the reliability index, and an overlay indicating how each of the plurality of factual claims contributes to the reliability index. In some examples of the method, apparatus, and non-transitory computer-readable medium described above, the visual representation comprises an assessment breakout comprising supporting links for the reliability index.

A method for assessing the veracity of content is described. The method may include determining a plurality of scores for a document based on a plurality of property categories, wherein the property categories comprise two or more of meta-data, content structure, and content veracity, determining a reliability index based on the plurality of scores, and providing a user with a plurality of views indicating factors contributing to the reliability index.

An apparatus for assessing the veracity of content is described. The apparatus may include a processor, memory in electronic communication with the processor, and instructions stored in the memory. The instructions may be operable to cause the processor to determine a plurality of scores for a document based on a plurality of property categories, wherein the property categories comprise two or more of meta-data, content structure, and content veracity, determine a reliability index based on the plurality of scores, and provide a user with a plurality of views indicating factors contributing to the reliability index.

A non-transitory computer readable medium storing code for assessing the veracity of content is described. In some examples, the code comprises instructions executable by a processor to: determine a plurality of scores for a document based on a plurality of property categories, wherein the property categories comprise two or more of meta-data, content structure, and content veracity, determine a reliability index based on the plurality of scores, and provide a user with a plurality of views indicating factors contributing to the reliability index.

Some examples of the method, apparatus, and non-transitory computer-readable medium described above may further include performing natural language processing on the document to derive semantic meaning of text, wherein determining the plurality of scores is based at least in part on the semantic meaning.

Some examples of the method, apparatus, and non-transitory computer-readable medium described above may further include identifying a plurality of factual claims in the document. Some examples of the method, apparatus, and non-transitory computer-readable medium described above may further include determining whether each of the factual claims supports a conclusion of the document based on a claim context. Some examples of the method, apparatus, and non-transitory computer-readable medium described above may further include querying a trusted data repository for each of the plurality of factual claims. Some examples of the method, apparatus, and non-transitory computer-readable medium described above may further include determining the reliability index document based on the querying.

In some examples of the method, apparatus, and non-transitory computer-readable medium described above, the meta-data comprises an author, a source, advertising content, citations, spelling information, grammar information, or any combination thereof. In some examples of the method, apparatus, and non-transitory computer-readable medium described above, the user is provided with the plurality of views via a web browser.

DETAILED DESCRIPTION

Figure 1:
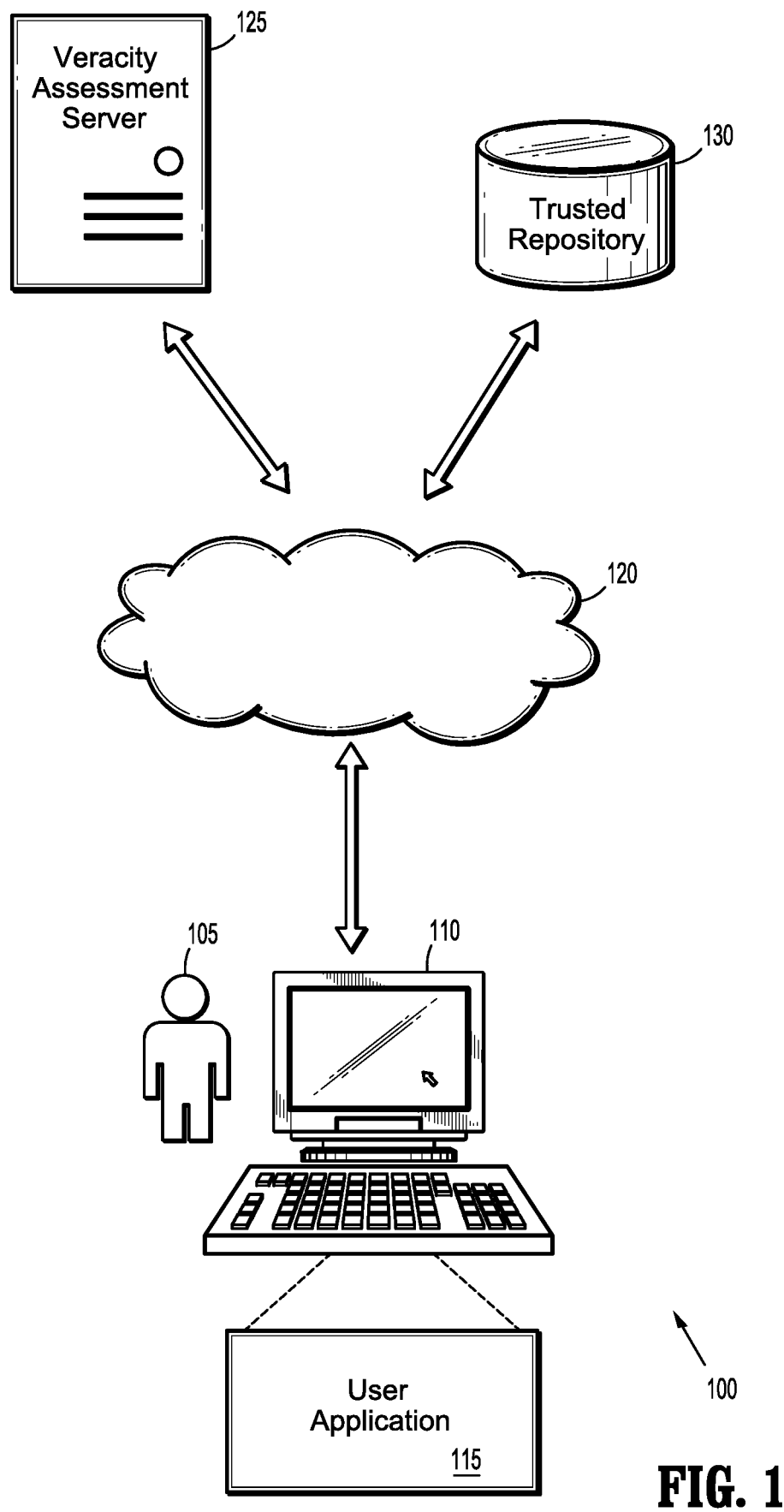
FIG. 1 shows an example of a content assessment system in accordance with aspects of the present disclosure.

With the large amount of information produced and available on the internet, consumers reading, watching, listening, or otherwise interacting with content from the Internet would benefit from a tool that allows discerning the accuracy of the content. Easily distinguishing factual information from fictional information would allow a consumer to place trust in the content and content-providers. In addition to helping consumers, there is also great value in the content-providers. A content-provider's reputation is upheld with unbiased evaluation and certification of content. In one aspect, certification is provided by a website, app, blog, platform directly, or is independently received from a service similar to certifications related to security. In one aspect, the certification is built into browsers or operating systems. In one aspect, disclosed methods provide a means to create a scaled reliability index for an identified body of text. The reliability index can easily be used by a content consumer to filter out unreliable content. This allows a consumer to evaluate the veracity of a document without manually tracking down all the facts.

Furthermore, utilizing a system that considers veracity, meta-data, and content structure together can enable an automated system to generate a sufficiently comprehensive reliability index to provide users with a sufficiently reliable interface for that they may determine the reliability of information without the need to transfer context to another system. This level of reliability and convenience may not be available from systems that require the user to shift focus from multiple interfaces, e.g., from a textual interface to source documents, meta-data analysis, structural analysis, etc.

Embodiments of the invention assess several aspects of content, primarily web based, but may be applied (in all or in part) to any document that can be provided in a consumable form. Embodiments of the invention assess different categories of data including, but not limited to the following:

document meta-data (page author, website ratings, advertisement content—percentage of page, ad content), content structure (identified content author(s), citation notation usage, accurate spell checking, syntactic checking), and content veracity (verifiable fact correctness, citation validation, footnote validation). After completing the assessments, embodiments of the invention combine each categories' result and provides an overall assessment rating or index score.

In addition to the overall assessment, views can be provided that highlight the various factors that led to the overall rating, either scoped by category or overall. This systematic approach may yield a more consistent and accurate reliability rating, compared to manual scrutiny of the article. This approach may also provide time savings to the user (i.e., compared to manually looking up of these various document elements, or compared to other electronic systems for verifying content reliability).

FIG. 1 shows an example of a content assessment system 100 in accordance with aspects of the present disclosure. Content assessment system 100 may include user 105, user terminal 110, network 120, veracity assessment server 125, and trusted repository 130.

User terminal 110 may include user application 115 and may be a means by which the user 105 access content. User application 115 may be an example of, or include aspects of, the corresponding elements described with reference to FIG. 3.

Veracity assessment server 125 may communicate with the user terminal 110 and the trusted repository 130 via the network 120 to provide the user 105 with an assessment of content that is being viewed via the user terminal 110. Veracity assessment server 125 may be an example of, or include aspects of, the corresponding elements described with reference to FIG. 2.

Figure 2:
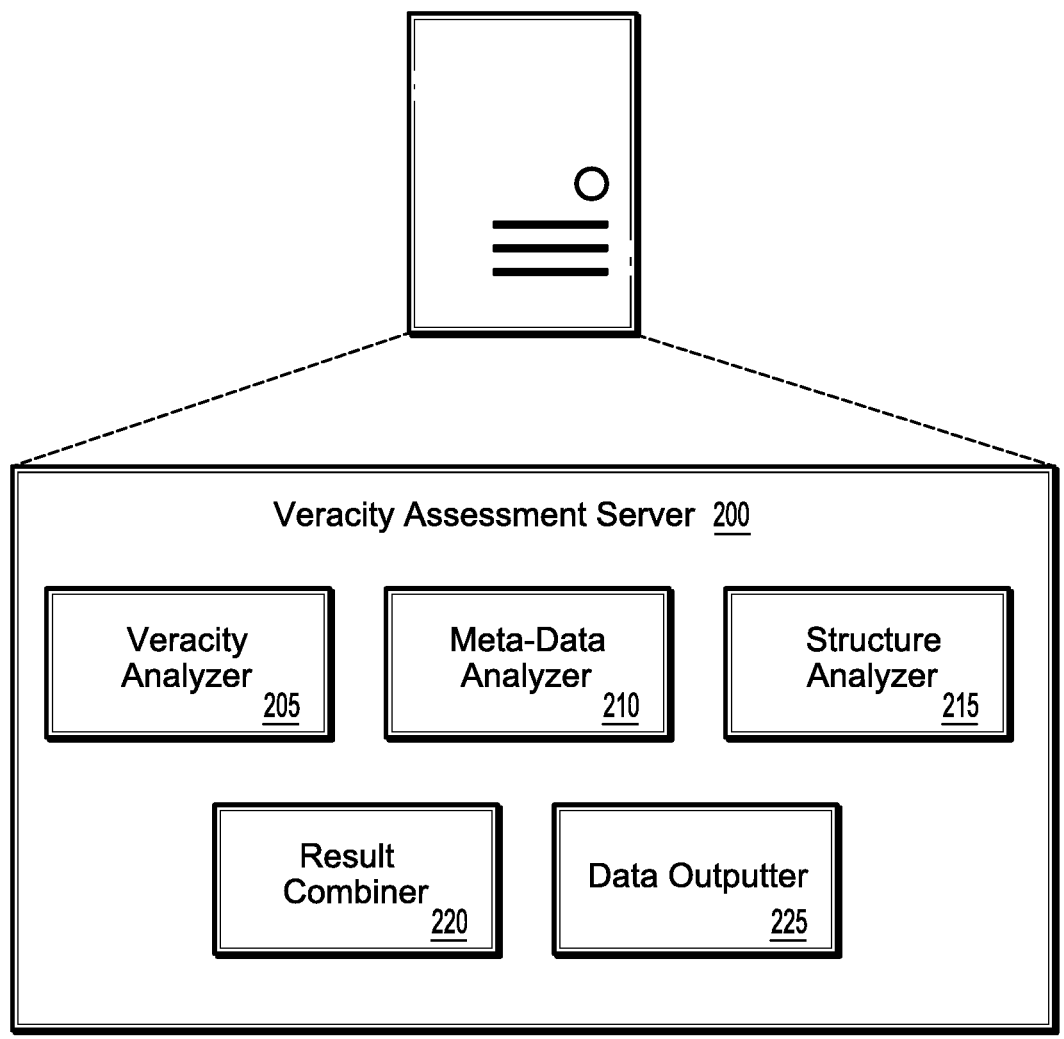
FIG. 2 shows an example of a veracity assessment server in accordance with aspects of the present disclosure.

FIG. 2 shows an example of a veracity assessment server 200 in accordance with aspects of the present disclosure. Veracity assessment server 200 may be an example of, or include aspects of, the corresponding elements described with reference to FIG. 1. Veracity assessment server 200 may include veracity analyzer 205, meta-data analyzer 210, structure analyzer 215, result combiner 220, and data outputter 225.

The meta-data analyzer 210 performs a document property analysis. The document property analysis identifies whether the document properties contain verifiable author name and/or information. Once the document properties are identified, the meta-data analyzer 210 provides a rating. A positive rating may be assigned when author information exists, a negative rating is assigned when author information cannot be validated, and a neutral rating is assigned when no author information is available. In one embodiment, the rating is assigned a value of −1, 0, and 1. It will be appreciated that other numeric values can be assigned in certain embodiments.

The meta-data analyzer 210 performs a reviews and ratings analysis. The reviews and ratings analysis searches for reviews and ratings of the source of the document. The source of the document can include, for example, websites, blogs, books, magazines, and the like. A scaled rating, ranging from negative to positive, is assigned into the category rating. In one embodiment, the rating is assigned a value of −1 through 1. It will be appreciated that other numeric values can be assigned in certain embodiments.

The meta-data analyzer 210 performs an advertisement content analysis. The advertisement content analysis assesses the advertising content. For example, the meta-data analyzer 210 may determine the ratio of content devoted to advertising. In one embodiment, a negative rating is assigned when the percentage of advertisements is greater than x %. A positive rating is assigned when the percentage of content devoted to advertising is less than y %. A neutral rating is assigned when the percentage of content is between x and y, inclusive. Additionally, the meta-data analyzer 210 analyzes the ad content. Based on the ad content, a negative rating is assigned when the breadth of the content appears to be sponsored content oriented towards subjects that include, for example, pornography, short term loans, and get rich quick gimmicks. In one embodiment, the rating is assigned a value of −2, −1, 0, and +1. It will be appreciated that other numeric values can be assigned in certain embodiments.

The meta-data analyzer 210 further assesses the results from the document properties analysis, reviews and ratings analysis, and the advertising content analysis, by inputting the assigned value and outputting a meta-data score. In one embodiment, the positive and negative ratings are added to output a meta-data score.

The content structure analyzer 215 performs an authorship notation analysis. A positive rating is assigned when the document's authorship is verifiable. A positive rating is further assigned when the authorship is identified to be knowledgeable on the document content. The quality of the authorship is based on, for example, web-based feedback, identified degrees, scholarly articles with good ratings/reviews, among others. A negative rating is assigned when the authorship is not verifiable. In one embodiment, the rating is assigned a value of −1, +1, and +2. It will be appreciated that other numeric values can be assigned in certain embodiments.

The content structure analyzer 215 performs a reference analysis. The reference analysis assesses the document for inclusion of references. A positive rating is assigned when the content structure analyzer 215 identifies footnotes in the document. A positive rating is also assigned when in-line, external acknowledgements are identified. The rating is not duplicated if both footnotes and in-line external acknowledgements are directed towards the same reference. In one embodiment, the rating is assigned a value of 0 and +1. It will be appreciated that other numeric values can be assigned in certain embodiments.

The content structure analyzer 215 performs a spelling and grammar analysis. The spelling and grammar analysis includes a spell-checking function, and grammatical analysis of the document using Natural Language Processing (NLP). The content structure analyzer 215 assigns a negative rating for a spell-checking failure greater than z %. The content structure analyzer 215 assigns a negative rating for grammar errors greater than j %. In one embodiment, the rating is assigned a value of −2, −1, and 0. It will be appreciated that other numeric values can be assigned in certain embodiments.

The content structure analyzer 215 further assesses the results from the authorship notation analysis, the reference analysis, and the spelling and grammar analysis, by inputting the assigned value and outputting a content structure score. In one embodiment, the positive and negative ratings are added to output a content structure score.

The veracity analyzer 205 performs a fact analysis. The fact analysis includes inputting the document content through an NLP algorithm to identify the complete list of facts stated. The fact analyzer cross-references each fact with a known trusted repository to confirm the validity of the fact. For each verifiable fact, a positive rating is assigned. For each non-verifiable fact, a neutral rating is assigned. For each fact that is verifiably non-factual, a negative rating is assigned. The section of the document related to that fact for use in the presentation mode is noted, and the section is denoted a positive, negative, and neutral rating.

The veracity analyzer 205 performs a fact percentage analysis. The fact percentage analysis includes determining the percentage of facts that were deemed false and the percentage of facts that were deemed true from the fact analysis. A scaled negative rating is created, based on the percentage of false facts being greater than a base percentage. A scaled positive rating is created based on the percentage of true facts, ranging from a given minimum percentage, m, to 100.

The veracity analyzer 205 performs a citation assessment. The citation assessment inputs the results from the content structure analyzer 215. The citation assessment determines the existence of the reference material. A negative rating is assigned if no evidence of the document is found. A positive rating is assigned if the reference can be located and the referenced fact is properly cited.

The veracity analyzer 205 further assesses the results from the fact analysis and veracity analyzer 205, by inputting the assigned value and outputting a content veracity score. In one embodiment, the positive and negative ratings are added to output a content veracity score.

The result combiner 220 combines the results of the category assessments. The category assessments include, for example, the meta-data score, the content structure score, and content veracity score. The result combiner 220 weighs each category to determine the relative impact on the overall assessment. For example, in certain embodiments, the reliability index may be more heavily weighted compared to the meta-data score and content structure score.

The result combiner 220 derives an overall status based on the weighted results, resulting in an overall document assessment score. The document assessment score is normalized to a score that is easy to understand by a user (e.g. consumer, content-provider). The scale may be one of a letter grade, a scale from 1 to 10, and 5 stars.

The document assessment score is presented by the data outputter 225. The document assessment score is displayed to a consumer and/or a content provider. Examples of displaying a document assessment score include displaying the information in a header area, or as a plugin on a website. In certain embodiments, an overlay or alternate view is highlighted through color, font styling, or other visual indicators the positive, negative and neutral parts of the document. An assessment breakdown, which provides links, references, and otherwise supportive information is provided to support each aspect of the assessment. The advantage of an assessment breakdown is that it provides insight to a user, consumer, and/or a content provider.

Veracity analyzer 205 may determine a truth rating for each of a plurality of factual claims in a document. Veracity analyzer 205 may also generate a veracity score for the document based on the truth rating for each of the identified plurality of factual claims. Veracity analyzer 205 may also query one or more trusted data repositories for each factual claim of the plurality of factual claims.

Veracity analyzer 205 may assign a positive rating to the factual claim if the query indicates the query indicates the factual claim is true. Veracity analyzer 205 may also assign a neutral rating to the factual claim if the query indicates the query indicates that the factual claim cannot be verified. Veracity analyzer 205 may also assign a negative rating to the factual claim if the query indicates the query indicates the factual claim is false. Veracity analyzer 205 may also determine a ratio of true factual claims for the document based at least in part on the positive rating, the neutral rating, or the negative rating, wherein the veracity score is based on the ratio of true factual claims.

Veracity analyzer 205 may identify one or more citations from supporting the plurality of factual claims. Veracity analyzer 205 may also determine whether the one or more citations are verifiable. Veracity analyzer 205 may also generate a citation index based on the determination of whether the one or more citations are verifiable, wherein the veracity score is based at least in part on the citation index.

The veracity analyzer 205 may also perform natural language processing on the document to derive semantic meaning of text, wherein determining the plurality of scores is based at least in part on the semantic meaning. Veracity analyzer 205 may also identify a plurality of factual claims in the document. Veracity analyzer 205 may also determine whether each of the factual claims supports a conclusion of the document based on a claim context. Veracity analyzer 205 may also query a trusted data repository for each of the plurality of factual claims. Veracity analyzer 205 may also determine the reliability index document based on the querying.

Meta-data analyzer 210 may generate a meta-data score for the document based on metadata of the document. Meta-data analyzer 210 may also generate an author rating based on an author of the document, wherein the meta-data score is based at least in part on the author rating. Meta-data analyzer 210 may also generate a source rating based on a source of the document, wherein the meta-data score is based at least in part on the source rating. Meta-data analyzer 210 may also generate an advertising rating based on one or more advertisements presented together with the document at a document source, wherein the meta-data score is based at least in part on the advertising rating. In some examples, the meta-data comprises an author, a source, advertising content, citations, spelling information, grammar information, or any combination thereof.

Structure analyzer 215 may generate a content structure score based at least in part on an authorship rating, a document references rating, a spelling rating, a grammar rating, or any combination thereof, wherein the reliability index is based at least in part on the content structure score.

Thus, veracity analyzer 205, meta-data analyzer 210, and/or content structure analyzer 215 may determine a plurality of scores for a document based on a plurality of property categories, where the property categories comprise two or more of meta-data, content structure, and content veracity. For example, veracity analyzer 205 may assess content veracity and generate a veracity score, while the meta-data analyzer 210 and content structure analyzer 215 may generate the scores for meta-data and/or content structure, respectively.

Result combiner 220 may generate a reliability index for the document based on the veracity score, the meta-data score, and/or the content structure score. Result combiner 220 may also assign a category weight to the veracity score, the meta-data score, a content structure score, or any combination thereof, wherein the reliability index is based at least in part on the category weights. Result combiner 220 may also determine a reliability index based on the plurality of scores.

Data outputter 225 may present the veracity score, the meta-data score, or the reliability index to a user via a user application. In some examples, the presenting the veracity score, the meta-data score, or the reliability index comprises modifying a visual representation of the document. In some examples, the visual representation comprises a header area including the reliability index, and an overlay indicating how each of the plurality of factual claims contributes to the reliability index. In some examples, the visual representation comprises an assessment breakout comprising supporting links for the reliability index.

Data outputter 225 may provide a user with a plurality of views indicating factors contributing to the reliability index. In some examples, the user is provided with the plurality of views via a web browser (e.g., as shown below with reference to FIG. 3).

Figure 3:
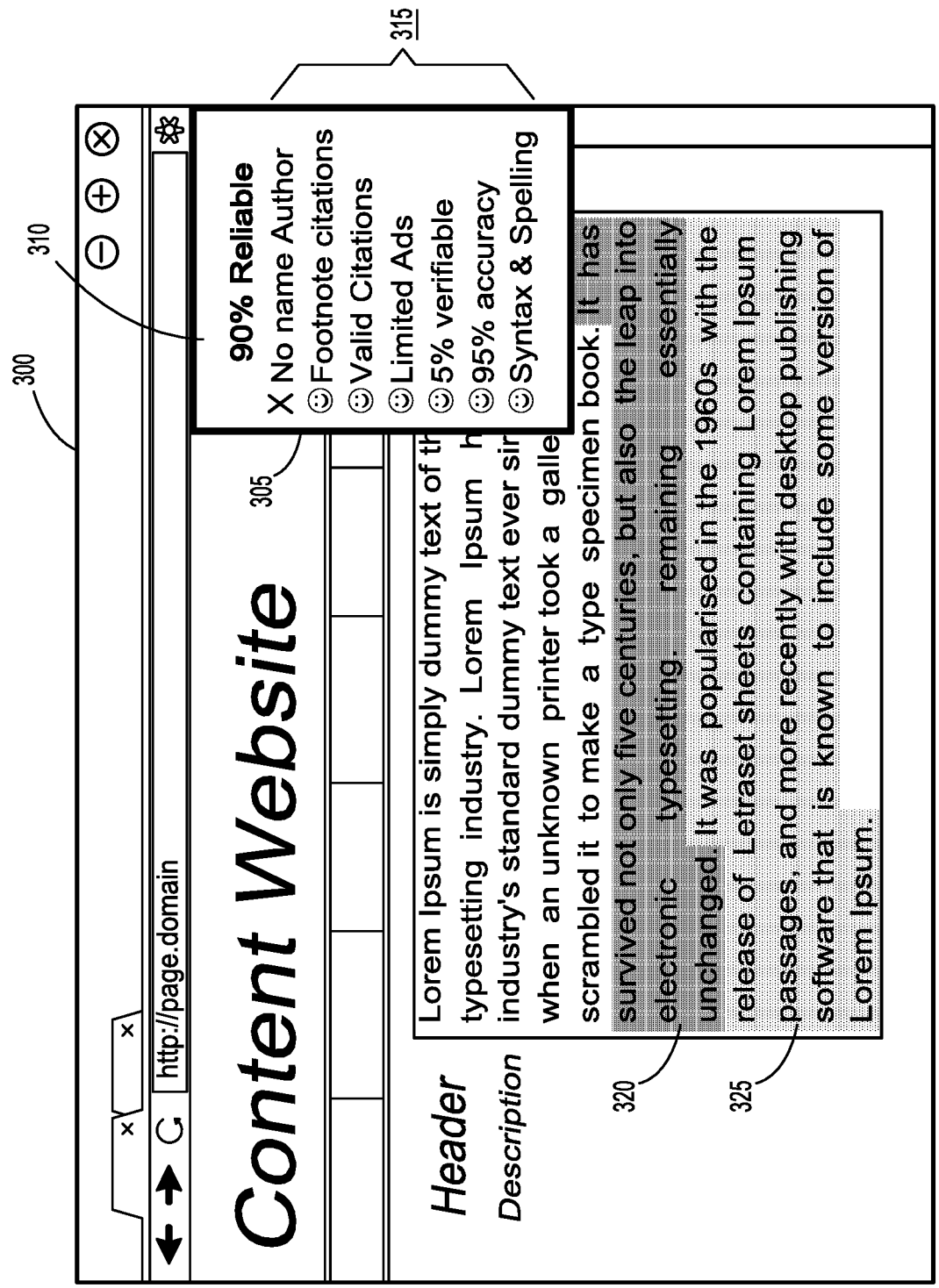
FIG. 3 shows an example of a user application in accordance with aspects of the present disclosure.

FIG. 3 shows an example of a user application 300 in accordance with aspects of the present disclosure. User application 300 may be an example of, or include aspects of, the corresponding elements described with reference to FIG. 1. User application 300 may include header area 305, verified overlay 320 (indicating a verified factual claim), and unverified overlay 325 (indicating an unverified or false factual claim). Header area 305 may display reliability factors 315 such as whether the document includes the name of the author, footnotes citations, validated citations, limited advertisements, verifiable facts, proper spelling and syntax, etc.

The user application 300 in FIG. 3 is represented as a website browser, but other user applications may incorporate the reliability index 310 and other content veracity indicators. For example, the user application 300 may be a pdf reader, an electronic document reader, a presentation program, a special purpose content viewer, etc.

Figure 4:
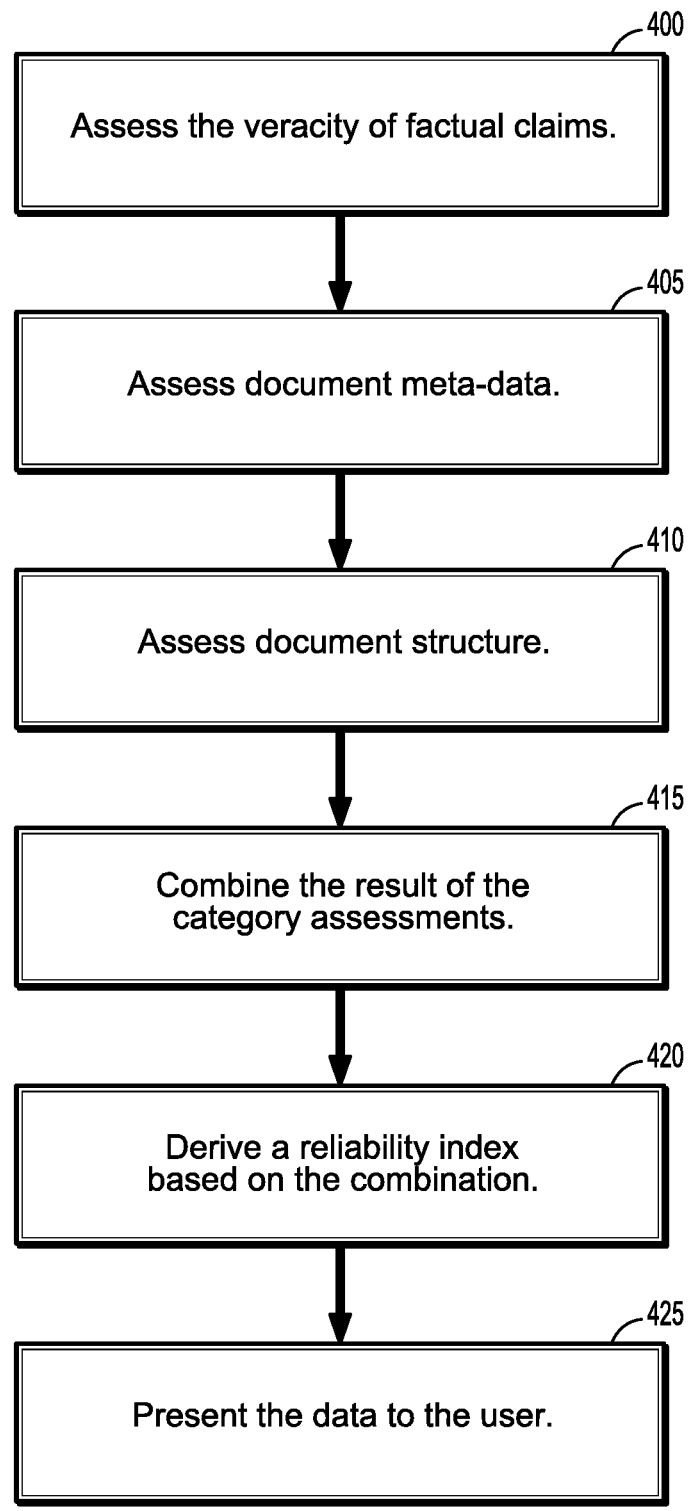
FIG. 4 shows an example of a process for determining the reliability of a document in accordance with aspects of the present disclosure.

FIG. 4 shows an example of a process for determining the reliability of a document in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed by a content assessment system according to the methods and processes described in accordance with aspects of the present disclosure. For example, the operations may be composed of various substeps, or may be performed in conjunction with other operations described herein.

At step 400, the content assessment system may assess the veracity of factual claims. In some cases, the operations of this step may refer to, or be performed by, a veracity analyzer as described with reference to FIG. 2.

At step 405, the content assessment system may assess document meta-data. In some cases, the operations of this step may refer to, or be performed by, a meta-data analyzer as described with reference to FIG. 2.

At step 410, the content assessment system may assess document structure. In some cases, the operations of this step may refer to, or be performed by, a structure analyzer as described with reference to FIG. 2.

At step 415, the content assessment system may combine the result of the category assessments. In some cases, the operations of this step may refer to, or be performed by, a result combiner as described with reference to FIG. 2.

At step 420, the content assessment system may derive an overall status (i.e., a reliability index) based on the combination. In some cases, the operations of this step may refer to, or be performed by, a result combiner as described with reference to FIG. 2.

At step 425, the content assessment system may present the data to the user. In some cases, the operations of this step may refer to, or be performed by, a data outputter as described with reference to FIG. 2.

The result combiner combines the results of the various category assessments. The category assessments include, for example, the meta-data score, the content structure score, and content veracity score. The result combiner weighs each category to determine the relative impact on the overall assessment. For example, in certain embodiments, the reliability index may be more heavily weighted compared to the meta-data score and content structure score.

The result combiner derives an overall status or reliability index based on the weighted results, resulting in an overall document assessment score. The document assessment score is normalized to a score that is easy to understand by a user (e.g. consumer, content-provider). The scale may be one of a number grade, a letter grade, a scale from 1 to 10, and 5 stars.

The document assessment score is presented by the data outputter. The document assessment score is displayed to a consumer and/or a content provider. Examples of displaying a document assessment score include displaying the information in a header area, or as a plugin on a website, or via a plugin in a document reader such as a pdf reader. In certain embodiments, an overlay or alternate view is highlighted through color, font styling, or other visual indicators the positive, negative and neutral parts of the document. An assessment breakdown, which provides links, references, and otherwise supportive information is provided to support each aspect of the assessment. The advantage of an assessment breakdown is that it provides insight to a user, consumer, and/or a content provider.

Figure 5:
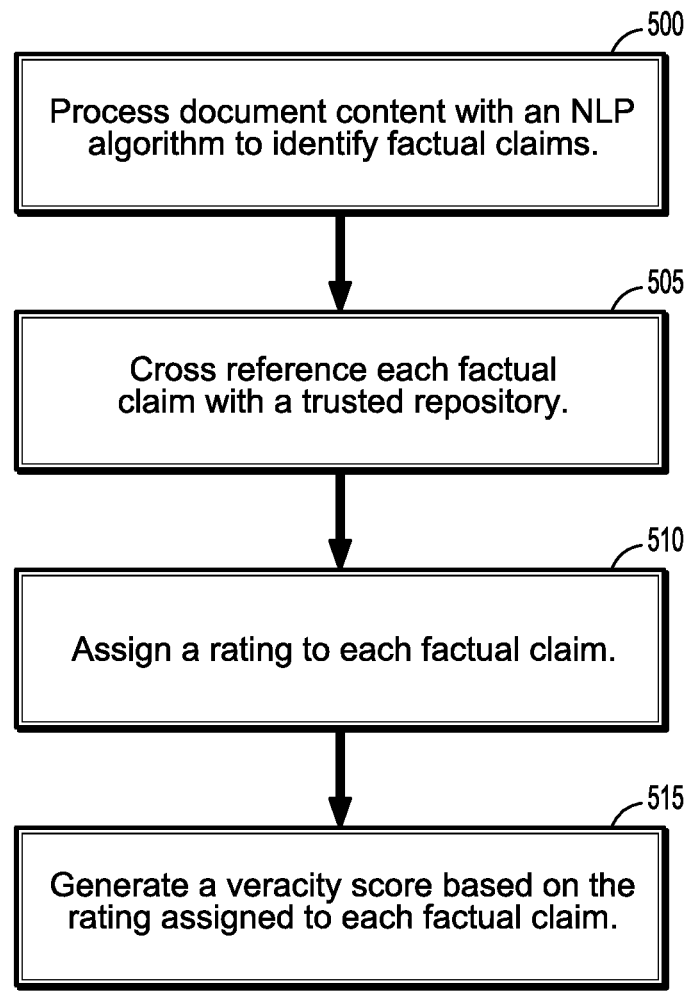
FIG. 5 shows an example of a process for veracity assessment in accordance with aspects of the present disclosure.

FIG. 5 shows an example of a process for veracity assessment in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed by a content assessment system according to the methods and processes described in accordance with aspects of the present disclosure. For example, the operations may be composed of various substeps, or may be performed in conjunction with other operations described herein.

At step 500, the content assessment system may process document content with an NLP algorithm to identify factual claims. In some cases, the operations of this step may refer to, or be performed by, a veracity analyzer as described with reference to FIG. 2.

At step 505, the content assessment system may cross reference each factual claim with a trusted repository. In some cases, the operations of this step may refer to, or be performed by, a veracity analyzer as described with reference to FIG. 2.

At step 510, the content assessment system may assign a rating to each factual claim. In some cases, the operations of this step may refer to, or be performed by, a veracity analyzer as described with reference to FIG. 2.

At step 515, the content assessment system may generate a veracity score based on the rating assigned to each factual claim. In some cases, the operations of this step may refer to, or be performed by, a veracity analyzer as described with reference to FIG. 2.

The veracity analyzer may assess the results from the fact analysis by inputting the assigned value and outputting a content veracity score. In one embodiment, the positive and negative ratings are added to output a content veracity score.

Figure 6:
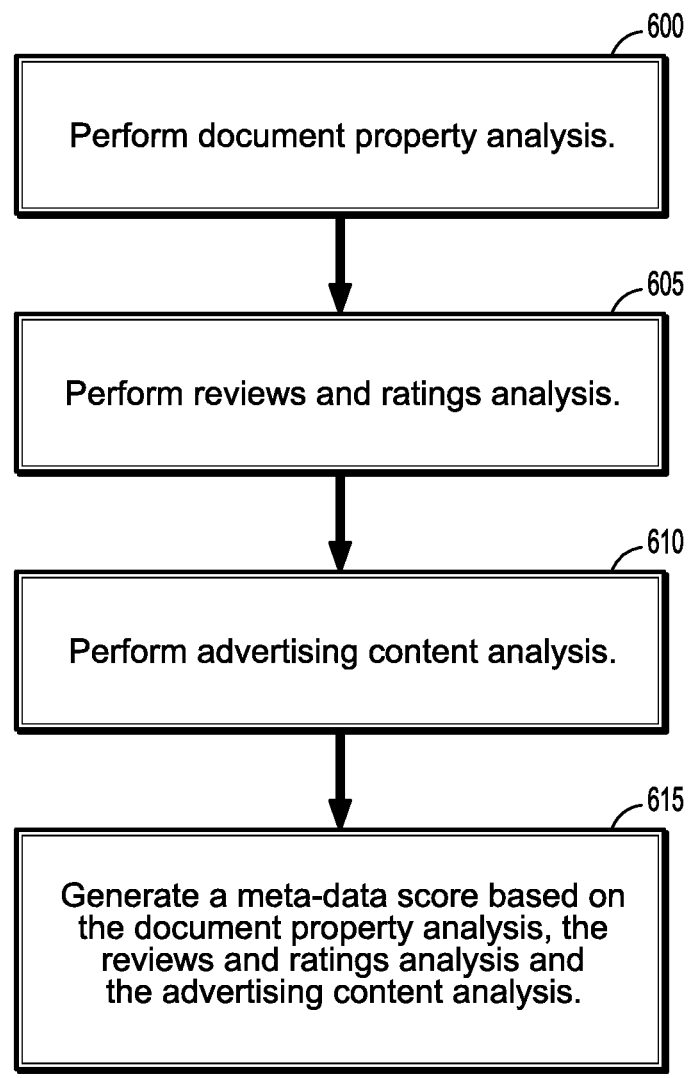
FIG. 6 shows an example of a process for meta-data assessment in accordance with aspects of the present disclosure.

FIG. 6 shows an example of a process for meta-data assessment in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed by a content assessment system according to the methods and processes described in accordance with aspects of the present disclosure. For example, the operations may be composed of various substeps, or may be performed in conjunction with other operations described herein.

At step 600, the content assessment system may perform document property analysis. In some cases, the operations of this step may refer to, or be performed by, a meta-data analyzer as described with reference to FIG. 2.

At step 605, the content assessment system may perform reviews and ratings analysis. In some cases, the operations of this step may refer to, or be performed by, a meta-data analyzer as described with reference to FIG. 2.

At step 610, the content assessment system may perform advertising content analysis. In some cases, the operations of this step may refer to, or be performed by, a meta-data analyzer as described with reference to FIG. 2.

At step 615, the content assessment system may generate a meta-data score based on the document property analysis, the reviews and ratings analysis and the advertising content analysis. In some cases, the operations of this step may refer to, or be performed by, a meta-data analyzer as described with reference to FIG. 2.

The meta-data analyzer may perform a document property analysis. The document property analysis identifies whether the document properties contain verifiable author name and/or information. Once the document properties are identified, the meta-data analyzer provides a rating. A plus rating is assigned when author information exists, a negative rating is assigned when author information cannot be validated, and a neutral rating is assigned when no author information is available. In one embodiment, the rating is assigned a value of −1, 0, and 1. It will be appreciated that other numeric values can be assigned in certain embodiments.

The meta-data analyzer may perform a reviews and ratings analysis. The reviews and ratings analysis searches for reviews and ratings of the source of the document. The source of the document can include, for example, websites, flogs, books, magazines, and the like. A scaled rating, ranging from negative to positive, is assigned into the category rating. In one embodiment, the rating is assigned a value of −1 through 1. It will be appreciated that other numeric values can be assigned in certain embodiments.

The meta-data analyzer may perform an advertisement content analysis. The advertisement content analysis assesses the advertising content. The percentage of content devoted to advertising. In one embodiment, a negative rating is assigned when the percentage of advertisements is greater than x %. A positive rating is assigned when the percentage of content devoted to advertising is less than y %. A neutral rating is assigned when the percentage of content is between x and y, inclusive. Additionally, the meta-data analyzer analyzes the ad content. Based on the ad content, a negative rating is assigned when the breadth of the content appears to be sponsored content oriented towards subjects that include, for example, pornography, short term loans, and get rich quick gimmicks. In one embodiment, the rating is assigned a value of −2, −1, 0, and +1. It will be appreciated that other numeric values can be assigned in certain embodiments.

The meta-data analyzer may further assess the results from the document properties analysis, reviews and ratings analysis, and the advertising content analysis, by inputting the assigned value and outputting a meta-data score. In one embodiment, the positive and negative ratings are added to output a meta-data score.

Figure 7:
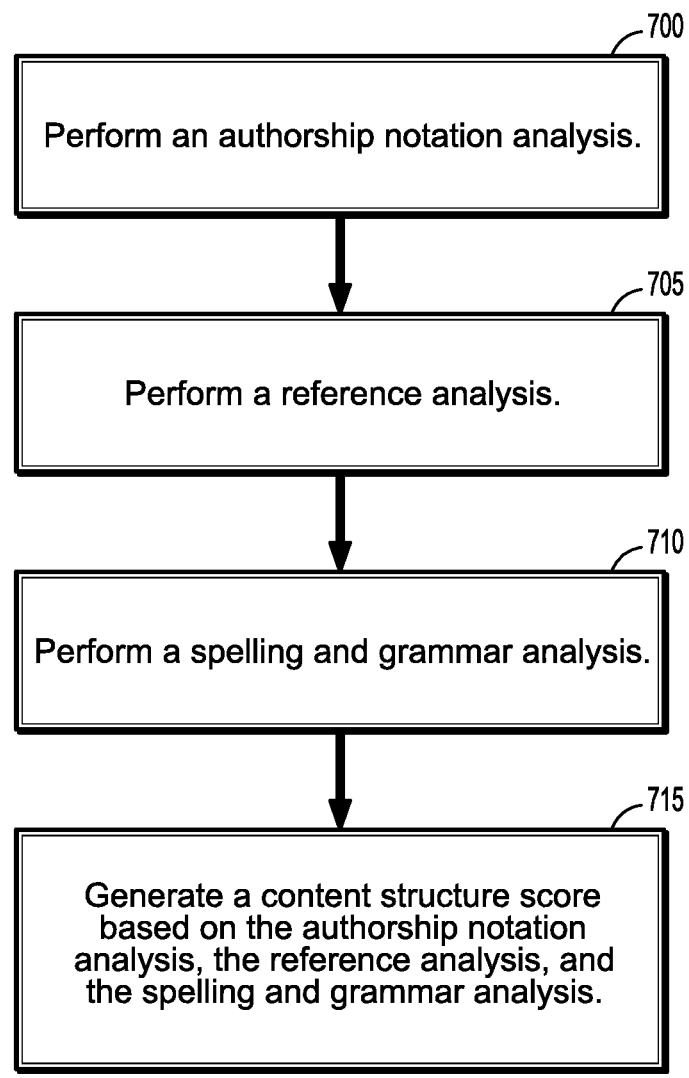
FIG. 7 shows an example of a process for content structure assessment in accordance with aspects of the present disclosure.

FIG. 7 shows an example of a process for content structure assessment in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed by a content assessment system according to the methods and processes described in accordance with aspects of the present disclosure. For example, the operations may be composed of various substeps, or may be performed in conjunction with other operations described herein.

At step 700, the content assessment system may perform an authorship notation analysis. In some cases, the operations of this step may refer to, or be performed by, a structure analyzer as described with reference to FIG. 2.

At step 705, the content assessment system may perform a reference analysis. In some cases, the operations of this step may refer to, or be performed by, a structure analyzer as described with reference to FIG. 2.

At step 710, the content assessment system may perform a spelling and grammar analysis. In some cases, the operations of this step may refer to, or be performed by, a structure analyzer as described with reference to FIG. 2.

At step 715, the content assessment system may generate a content structure score based on the authorship notation analysis, the reference analysis, and the spelling and grammar analysis. In some cases, the operations of this step may refer to, or be performed by, a structure analyzer as described with reference to FIG. 2.

The content structure analyzer may perform an authorship notation analysis. A positive rating is assigned when the document's authorship is verifiable. A positive rating is further assigned when the authorship is identified to be knowledgeable on the document content. The quality of the authorship is based on, for example, web-based feedback, identified degrees, scholarly articles with good ratings/reviews, among others. A negative rating is assigned when the authorship is not verifiable. In one embodiment, the rating is assigned a value of −1, +1, and +2. It will be appreciated that other numeric values can be assigned in certain embodiments.

The content structure analyzer may perform a reference analysis. The reference analysis assesses the document for inclusion of references. A positive rating is assigned when the content structure analyzer identifies footnotes in the document. A positive rating is also assigned when in-line, external acknowledgements are identified. The rating is not duplicated if both footnotes and in-line external acknowledgements are directed towards the same reference. In one embodiment, the rating is assigned a value of 0 and +1. It will be appreciated that other numeric values can be assigned in certain embodiments.

The content structure analyzer may perform a spelling and grammar analysis. The spelling and grammar analysis includes a spell-checking function, and grammatical analysis of the document using Natural Language Processing (NLP). The content structure analyzer assigns a negative rating for a spell-checking failure greater than z %. The content structure analyzer assigns a negative rating for grammar errors greater than j %. In one embodiment, the rating is assigned a value of −2, −1, and 0. It will be appreciated that other numeric values can be assigned in certain embodiments.

Figure 8:
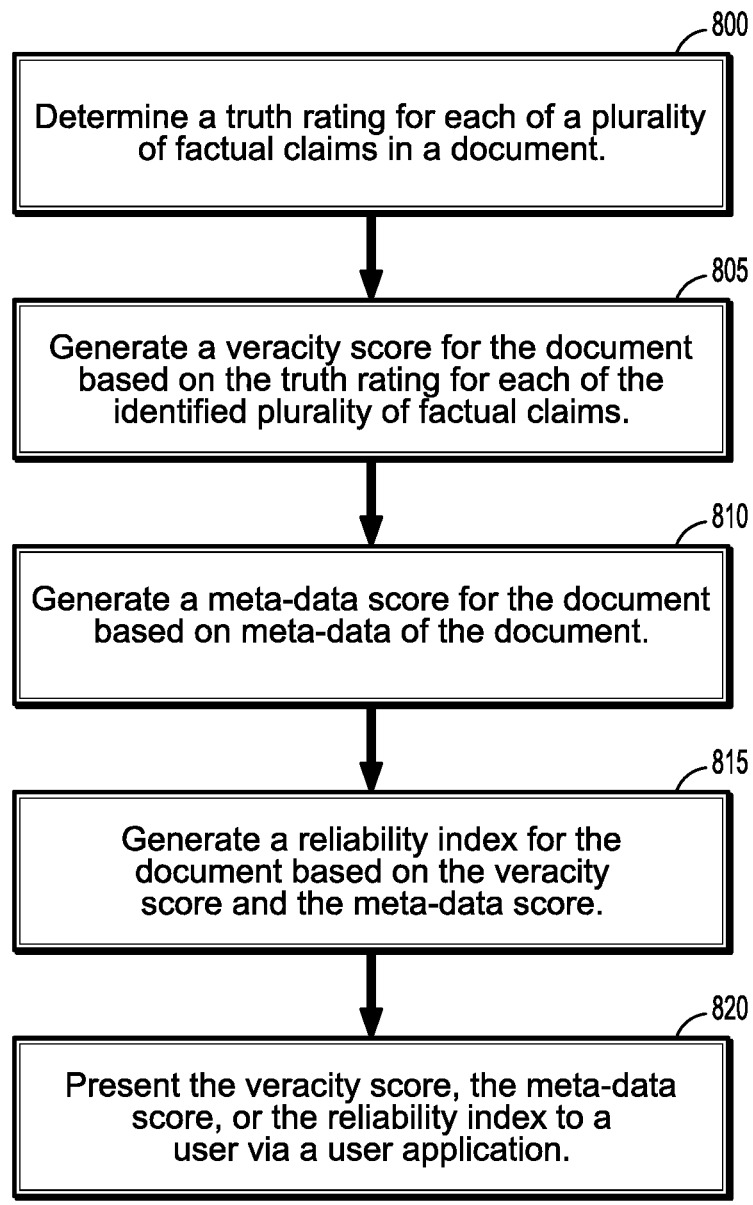
FIGS. 8 through 10 show examples of processes for determining the reliability of a document in accordance with aspects of the present disclosure.

FIG. 8 shows an example of a process for determining the reliability of a document in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed by a content assessment system according to the methods and processes described in accordance with aspects of the present disclosure. For example, the operations may be composed of various substeps, or may be performed in conjunction with other operations described herein.

At step 800, the content assessment system may determine a truth rating for each of a plurality of factual claims in a document. In some cases, the operations of this step may refer to, or be performed by, a veracity analyzer as described with reference to FIG. 2.

At step 805, the content assessment system may generate a veracity score for the document based on the truth rating for each of the identified plurality of factual claims. In some cases, the operations of this step may refer to, or be performed by, a veracity analyzer as described with reference to FIG. 2.

At step 810, the content assessment system may generate a meta-data score for the document based on metadata of the document. In some cases, the operations of this step may refer to, or be performed by, a meta-data analyzer as described with reference to FIG. 2.

At step 815, the content assessment system may generate a reliability index for the document based on the veracity score and the meta-data score. In some cases, the operations of this step may refer to, or be performed by, a result combiner as described with reference to FIG. 2.

At step 820, the content assessment system may present the veracity score, the meta-data score, or the reliability index to a user via a user application. In some cases, the operations of this step may refer to, or be performed by, a data outputter as described with reference to FIG. 2.

Figure 9:
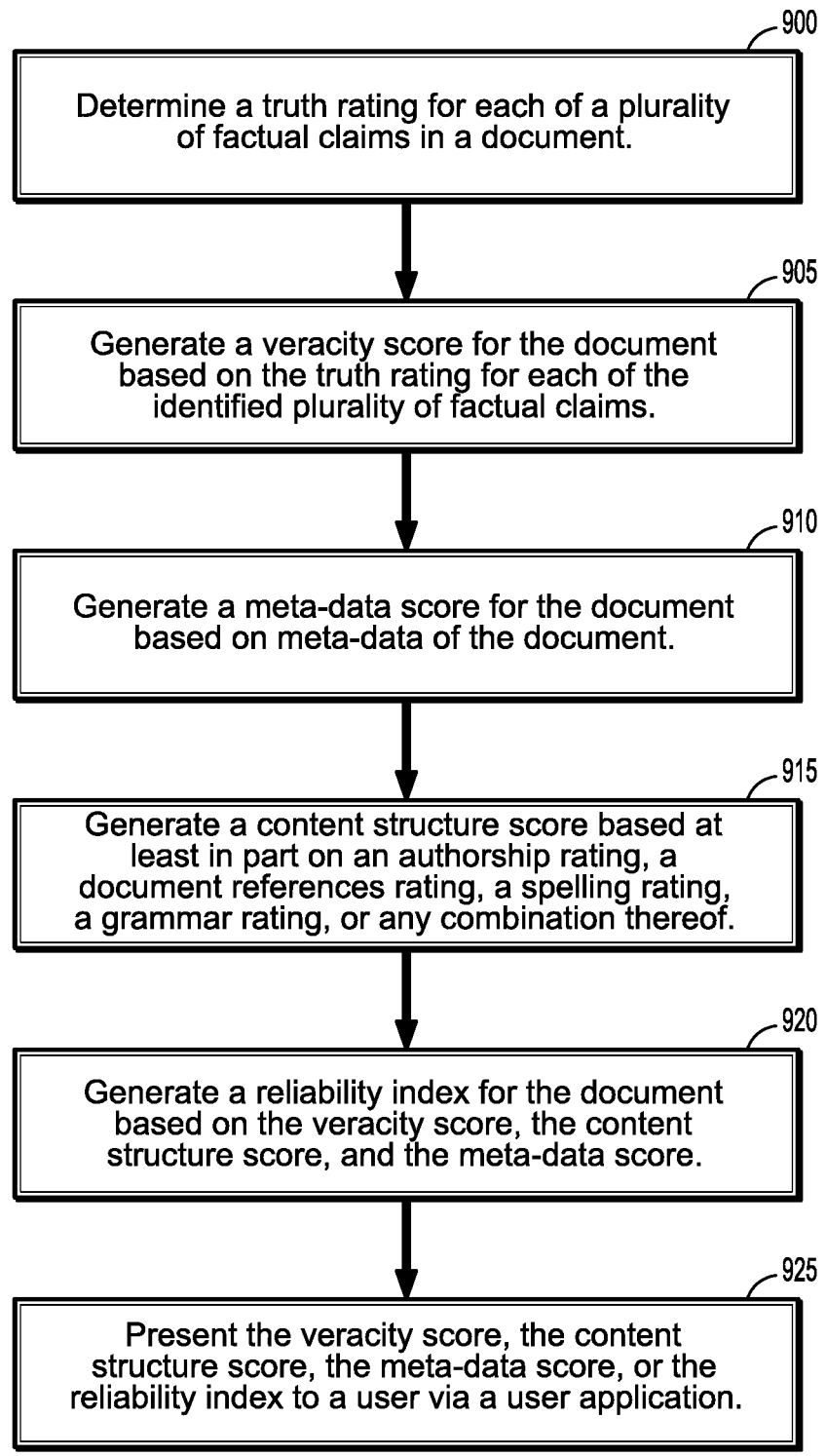

FIG. 9 shows an example of a process for determining the reliability of a document in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed by a content assessment system according to the methods and processes described in accordance with aspects of the present disclosure. For example, the operations may be composed of various substeps, or may be performed in conjunction with other operations described herein.

At step 900, the content assessment system may determine a truth rating for each of a plurality of factual claims in a document. In some cases, the operations of this step may refer to, or be performed by, a veracity analyzer as described with reference to FIG. 2.

At step 905, the content assessment system may generate a veracity score for the document based on the truth rating for each of the identified plurality of factual claims. In some cases, the operations of this step may refer to, or be performed by, a veracity analyzer as described with reference to FIG. 2.

At step 910, the content assessment system may generate a meta-data score for the document based on metadata of the document. In some cases, the operations of this step may refer to, or be performed by, a meta-data analyzer as described with reference to FIG. 2.

At step 915, the content assessment system may generate a content structure score based at least in part on an authorship rating, a document references rating, a spelling rating, a grammar rating, or any combination thereof. In some cases, the operations of this step may refer to, or be performed by, a structure analyzer as described with reference to FIG. 2.

At step 920, the content assessment system may generate a reliability index fir the document based on the veracity score, the content structure score, and the meta-data score. In some cases, the operations of this step may refer to, or be performed by, a result combiner as described with reference to FIG. 2.

At step 925, the content assessment system may present the veracity score, the content structure score, the meta-data score, or the reliability index to a user via a user application. In some cases, the operations of this step may refer to, or be performed by, a data outputter as described with reference to FIG. 2.

Figure 10:
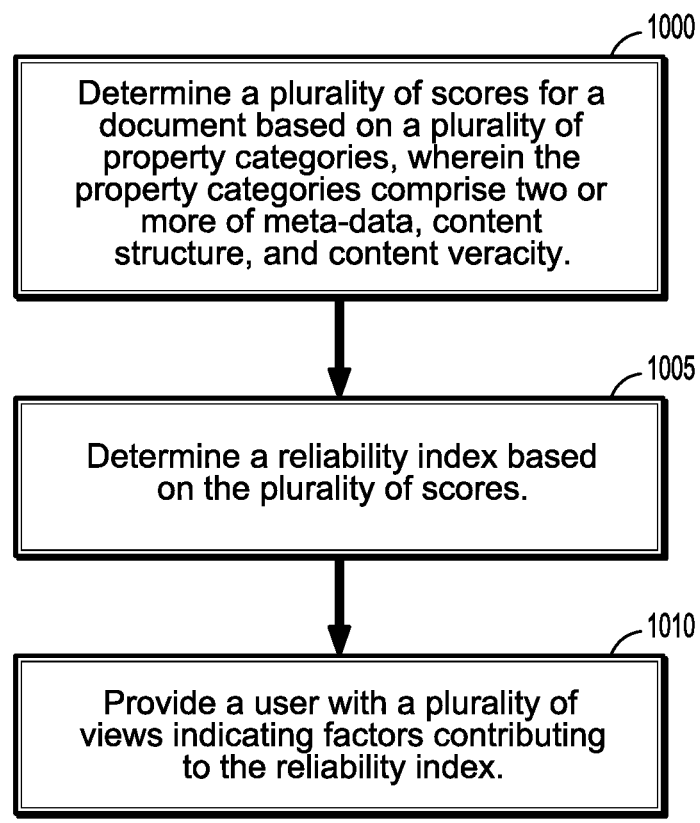

FIG. 10 shows an example of a process for determining the reliability of a document in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed by a content assessment system according to the methods and processes described in accordance with aspects of the present disclosure. For example, the operations may be composed of various substeps, or may be performed in conjunction with other operations described herein.

At step 1000, the content assessment system may determine a plurality of scores for a document based on a plurality of property categories, wherein the property categories comprise two or more of meta-data, content structure, and content veracity. In some cases, the operations of this step may refer to, or be performed by, a veracity analyzer, meta-data analyzer, and/or content structure analyzer as described with reference to FIG. 2.

At step 1005, the content assessment system may determine a reliability index based on the plurality of scores. In some cases, the operations of this step may reefer to, or be performed by, a result combiner as described with reference to FIG. 2.

At step 1010, the content assessment system may provide a user with a plurality of views indicating factors contributing to the reliability index. In some cases, the operations of this step may refer to, or be performed by, a data outputter as described with reference to FIG. 2.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. An apparatus for presenting a textual overlay based on the veracity of textual content, comprising:
a processor and a memory storing instructions and in electronic communication with the processor, the processor being configured to execute the instructions to:
determine a truth rating for each of a plurality of factual claims in a document;
generate a veracity score for the document based on the truth rating for each of the identified plurality of factual claims;
generate a meta-data score for the document based on metadata of the document, wherein the metadata score is based at least in part on whether properties of the document include verifiable author information;
generate a reliability index for the document based on the veracity score and the meta-data score; and
present the veracity score, the meta-data score, or the reliability index to a user via a user application.

2. The apparatus of claim 1, the processor being further configured to execute the instructions to:
query one or more trusted data repositories for each factual claim of the plurality of factual claims;
assign a positive rating to the factual claim if the query indicates the query indicates the factual claim is true;
assign a neutral rating to the factual claim if the query indicates the query indicates that the factual claim cannot be verified; and
assign a negative rating to the factual claim if the query indicates the query indicates the factual claim is false.

3. The apparatus of claim 1, the processor being further configured to execute the instructions to:
generate a content structure score based at least in part on an authorship rating, a document references rating, a spelling rating, a grammar rating, or any combination thereof, wherein the reliability index is based at least in part on the content structure score.

4. A method for content rating, comprising:
determining a truth rating for each of a plurality of factual claims in a document;
generating a veracity score for the document based on the truth rating for each of the identified plurality of factual claims;
generating a meta-data score for the document based on metadata of the document, wherein the metadata score is based at least in part on a ratio of advertising content in the document;
generating a reliability index for the document based on the veracity score and the meta-data score; and
presenting the veracity score, the meta-data score, or the reliability index to a user via a user application.

5. The method of claim 4, further comprising:
querying one or more trusted data repositories for each factual claim of the plurality of factual claims;
assigning a positive rating to the factual claim if the query indicates the query indicates the factual claim is true;
assigning a neutral rating to the factual claim if the query indicates the query indicates that the factual claim cannot be verified; and
assigning a negative rating to the factual claim if the query indicates the query indicates the factual claim is false.

6. The method of claim 5, further comprising:
determining a ratio of true factual claims for the document based at least in part on the positive rating, the neutral rating, or the negative rating, wherein the veracity score is based on the ratio of true factual claims.

7. The method of claim 4, further comprising:
identifying one or more citations from supporting the plurality of factual claims;
determining whether the one or more citations are verifiable; and
generating a citation index based on the determination of whether the one or more citations are verifiable, wherein the veracity score is based at least in part on the citation index.

8. The method of claim 4, further comprising:
generating an author rating based on an author of the document, wherein the meta-data score is based at least in part on the author rating.

9. The method of claim 4, further comprising:
generating a source rating based on a source of the document, wherein the meta-data score is based at least in part on the source rating.

10. The method of claim 4, further comprising:
generating an advertising rating based on one or more advertisements presented together with the document at a document source, wherein the meta-data score is based at least in part on the advertising rating.

11. The method of claim 4, further comprising:
generating a content structure score based at least in part on an authorship rating, a document references rating, a spelling rating, a grammar rating, or any combination thereof, wherein the reliability index is based at least in part on the content structure score.

12. The method of claim 4, further comprising:
assigning a category weight to the veracity score, the meta-data score, a content structure score, or any combination thereof, wherein the reliability index is based at least in part on the category weights.

13. The method of claim 4, wherein:
the presenting the veracity score, the meta-data score, or the reliability index comprises modifying a visual representation of the document.

14. The method of claim 13, wherein:
the visual representation comprises a header area including the reliability index, and an overlay indicating how each of the plurality of factual claims contributes to the reliability index.

15. The method of claim 14, wherein:
the visual representation comprises an assessment breakout comprising supporting links for the reliability index.

16. A method for content rating, comprising:
analyzing a content structure of a document by determining a ratio of spelling and grammar errors in the document to produce spelling and grammar information;
determining a plurality of scores for the document based on a plurality of property categories, wherein the property categories comprise meta-data, the content structure, and content veracity, and wherein the meta-data comprises the spelling and grammar information;
determining a reliability index based on the plurality of scores; and
providing a user with a plurality of views indicating factors contributing to the reliability index.

17. The method of claim 16, further comprising:
performing natural language processing on the document to derive semantic meaning of text, wherein determining the plurality of scores is based at least in part on the semantic meaning.

18. The method of claim 17, further comprising:
identifying a plurality of factual claims in the document;
determining whether each of the factual claims supports a conclusion of the document based on a claim context;
querying a trusted data repository for each of the plurality of factual claims; and
determining the reliability index document based on the querying.

19. The method of claim 16, wherein:
the meta-data comprises an author, a source, advertising content, citations, or any combination thereof.

20. The method of claim 16, wherein:
the user is provided with the plurality of views via a web browser.

* * * * *